Dec. 17, 1963    L. C. NEUFELD ETAL    3,114,167
WINDSHIELD CLEANING SYSTEM
Filed Dec. 14, 1961    2 Sheets-Sheet 1
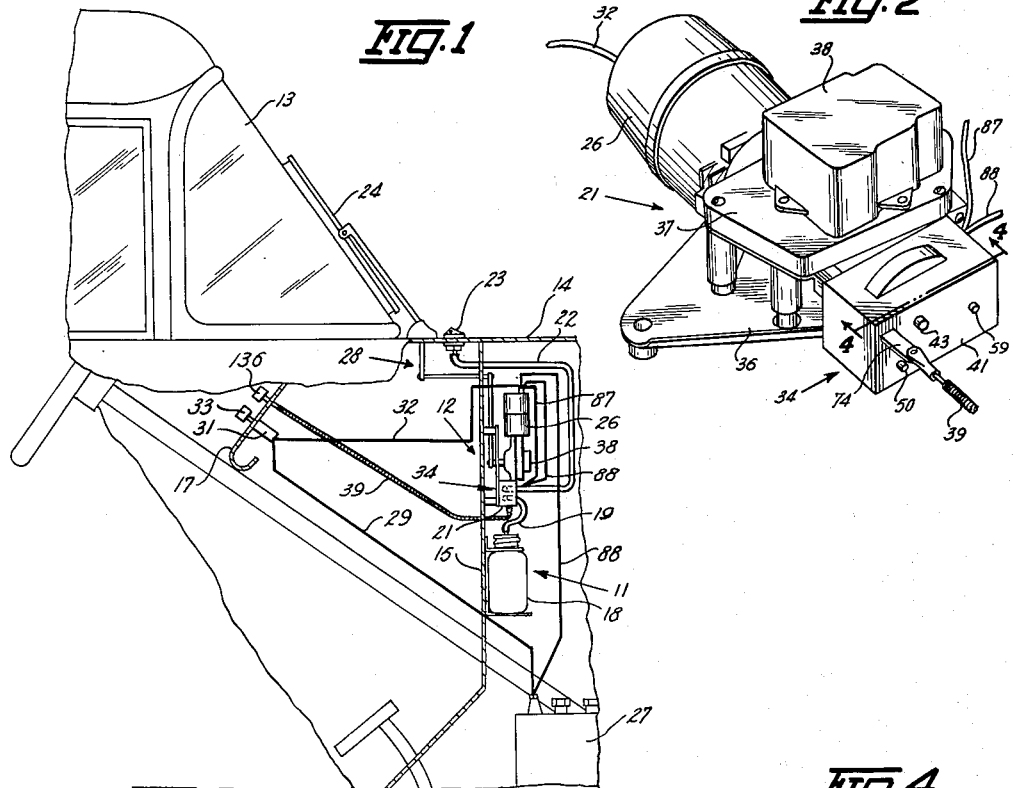
INVENTORS.
LEONARD C. NEUFELD
ALFRED H. SCHMALFELDT
BY Lowell & Henderson
ATTORNEYS.

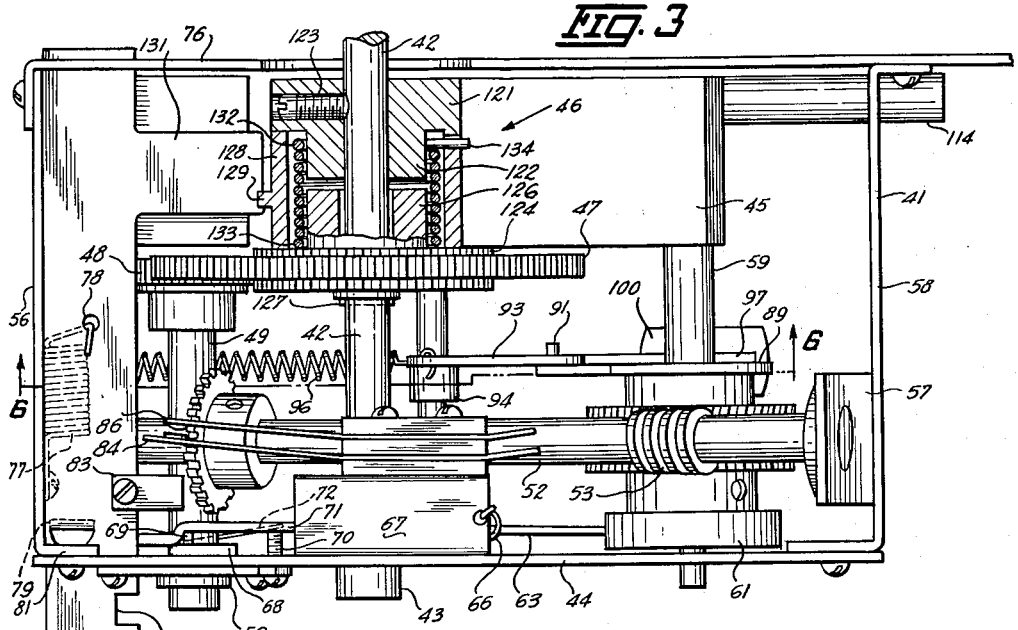
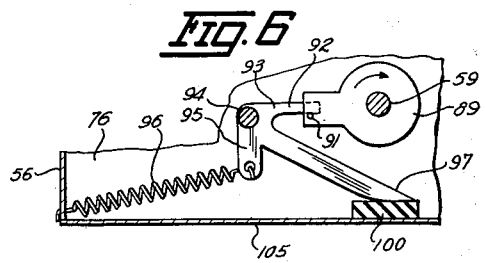
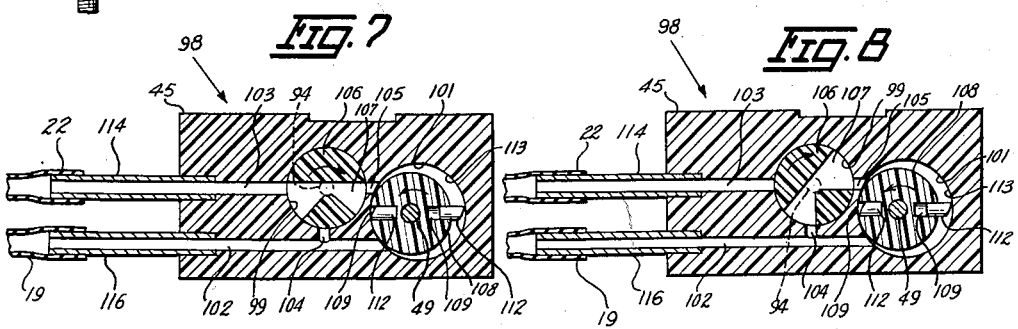
INVENTORS.
LEONARD C. NEUFELD
ALFRED H. SCHMALFELDT
BY Lowell & Henderson
ATTORNEYS.

United States Patent Office 3,114,167
Patented Dec. 17, 1963

3,114,167
WINDSHIELD CLEANING SYSTEM
Leonard C. Neufeld and Alfred H. Schmalfeldt, Des Moines, Iowa, assignors to The Delman Company, Cockeville, Tenn., a corporation of Tennessee
Filed Dec. 14, 1961, Ser. No. 159,273
10 Claims. (Cl. 15—250.02)

This invention relates generally to a windshield clearing system for vehicles, and more particularly to a system utilizing one power unit for a washer unit and a wiper unit, and wherein independent operation of the wiper unit or conjoint operation of the wiper and washer units is provided.

It is an object of this invention to provide an improved system for clearing a vehicle windshield.

It is a further object to provide a novel washer unit adapted for driving connection to a conventional wiper motor for receiving operating power therefrom, wherein the washer unit includes means for coordinating the operation of the wiper motor with the washer unit to provide conjoint cleaning fluid delivery and wiper blade oscillation on the windshield.

Another object of this invention is to provide a washer unit adapted for direct drive off the wiper motor, wherein operation of the washer unit and wiper motor is obtainable along with fully automatic delayed de-actuation of the wiper motor subsequent to cessation of the discharge of cleaning fluid by the washer unit.

Yet another object of this invention is the provision of structure capable of attaining the above designated objectives which is economical to manufacture, simple in construction, and effective in operation.

These objects and other features and advantages of this invention will become readily apparent from the following description, when taken in conjunction with the accompanying drawings, wherein:

FIG. 1 is a fragmentary side elevational view of a vehicle showing the invention in assembly relation therewith;

FIG. 2 is an enlarged perspective view of the combined wiper motor-washer assembly of this invention;

FIG. 3 is an enlarged top plan view of the washer assembly, the cover plate having been removed, and with certain parts shown in section for clarity of illustration;

FIG. 4 is an enlarged elevational view of the washer assembly as seen when viewed along the line 4—4 in FIG. 2, a portion of the front cover plate removed for illustrative clarity;

FIG. 5 is an enlarged perspective detail view of the washer assembly gear train in assembly relation with the washer pump;

FIG. 6 is a reduced detail view taken along the line 6—6 in FIG. 3;

FIG. 7 is a detail sectional view of the washer pump taken along the line 7—7 in FIG. 5, and showing the pump in a fluid discharge position; and FIG. 8 is a view similar to FIG. 7 and showing the pump in a fluid by-pass position.

With reference to the drawing, a vehicle windshield clearing system is disclosed which includes a washer unit and a wiper unit, designated respectively at 11 and 12 in FIG. 1. The vehicle is illustrated as having a windshield 13, an engine cowl 14 extended forwardly of the windshield, a fire wall 16 and a dashboard 17.

The washer unit 11 includes a fluid reservoir 18 mounted on the fire wall 16 for supplying fluid through a conduit 19 to an electrically operated wiper-washer assembly 21 mounted on the fire wall 16. The wiper-washer assembly 21, upon operation, withdraws fluid from the reservoir 18 and expels the fluid through another conduit 22 to one or more nozzles 23. Each nozzle 23 is mounted on the cowl 14 at a position forwardly of the windshield 13, and is adapted to discharge the fluid upwardly onto the windshield and into the path of movement of a windshield wiper blade 24, which forms a part of the wiper unit 12.

The wiper unit 12 also includes an electric wiper motor 26 which is part of the wiper-washer assembly 21. The motor 26 is energized by a battery 27 to drive the wiper blade 24 in an oscillating manner across the windshield 13 by means of the usual transmission mechanism indicated generally at 28 (FIG. 1). The battery 27 is connected in an electric circuit which includes a lead 29 to an on-off rotatable hand control switch 31 mounted on the dashboard 17, and another lead 32 conected between the control switch 31 and the wiper-washer assembly 21. For independent operation of the wiper motor 26, a knob 33 on the control switch 31 is merely rotated between on and off positions.

The wiper-washer assembly 21 (FIGS. 1 and 2), except for a washer kit indicated generally at 34, is a commercially available electric wiper motor structure which includes, in addition to the wiper motor 26 (FIG. 2), a mounting bracket 36, a gear housing 37 for transmitting drive to the mechanism 28, and an electric switch box 38. As will be brought out hereinafter in detail, the washer kit 34, which is operable by a hand controlled Bowden wire 39 (FIG. 1), is mechanically and electrically connected to the remainder of the wiper-washer assembly 21 so that upon actuation of the control wire 39, the washer and wiper units 11 and 12, respectively, coact to provide a discharge of fluid upon the windshield 13 simultaneously with oscillation of the wiper blade 24 thereacross. Additionally, the washer kit 34 is so constructed, that after a certain quantity of fluid has been discharged against the windshield 13, and after the fluid discharge has ceased for a pre-determined period of time, the operation of the wiper motor 26 is automatically stopped.

The washer kit 34 includes a housing 41 for enclosing a gear train which includes a shaft 42 (FIGS. 3 and 5). The shaft 42 is an extension of any rotatable element in the gear housing 37 and is connected to structure (not shown) therein which rotates in response to electric energization of the wiper motor 26. Therefore, whenever the electric motor 26 is operated to oscillate the wiper blades 24, the shaft 42 is rotated. The outer end of the shaft 42 is journaled in a bearing 43 attached to the front plate 44 of the housing 41. A clutch unit 46 is mounted on the shaft 42 for releasably driving a large gear 47 (FIG. 5), which in turn drives a small gear 48. The gear 48 is mounted on a drive shaft 49 one end of which extends into a pump housing 45 (see FIGS. 7 and 8), and the other end of which is journaled in a bearing 50 (FIG. 3) mounted on the front plate 44.

Drive is transmitted from the gear housing 37 by the shaft 49 to a first worm gear 51 (FIG. 5) and through an inclined shaft 52 to a second worm gear 53. One end of the inclined shaft 52 rotates in a bearing bracket 54 attached to one end plate 56 (FIG. 4), and the other end of the shaft 52 is journaled in a bearing bracket 57 attached to the other end plate 58 of the housing 41. The second worm gear 53 transmits drive to a driven shaft 59 which is journaled between the pump housing 45 and the front plate 44.

Mounted on the driven shaft 59 is a cam wheel 61 (FIGS. 3 and 4) which has a substantially circular peripheral surface 62 terminating in an outward, tangentially extended high side 80. A U-shaped lever 63 is pivotally mounted to the housing 41 by a pivot pin 64 (FIG. 4). One end 65 of the lever 63 is in continual engagement with the cam wheel surface 62 due to the bias of a spring 66 connected between the lever 63 and a bracket 67 mounted on the front plate 44. The cam wheel 61 is illustrated in FIG. 4 in its normal position at the beginning of a wiper-washer cycle, with the high side 80 engaged by the lever end 65.

The opposite free end 68 of the lever 63 has pivotally connected thereto a catch plate 71 which is biased in a counterclockwise direction, as viewed in FIG. 4, by a leaf spring 72. The spring 72 is connected at one end to the pivot 69 for the catch plate 71, and at the other end is connected to the catch plate 71. A lip 73 is provided on the catch plate 71 for engagement by the lever end 68 for a purpose hereinafter described. In the position of FIGS. 3 and 4, the catch plate 71 is spaced outwardly from the lever end 68 by the engagement of the catch plate 71 by a stud 70.

The catch plate 71 is in continual engagement with an actuating rod 74 (FIGS. 3 and 4) reciprocally movable through the front plate 44 and a rear plate 76 of the housing 41, and the outer end of which is connected to the Bowden wire 39. The actuating rod 74 is biased outwardly of the housing 41 by means of a spring 77 connected between the side plate 56 and the actuating rod 74 at an opening 78 provided therein. Outward movement of the actuating rod 74 from the housing 41 is limited by a projection 79 (FIG. 3) formed on the rod 74 to engage a portion 81 of the housing 41.

The actuating rod 74 is provided with a notch 82 in one side 85 so that upon movement of the actuating rod 74 into the housing 41 due to manipulation of the Bowden wire 39, upon alignment of the notch 82 with the catch plate 71, the latter will move into the notch 82 and thus temporarily prevent the actuating rod 74 from returning to its outermost position, upon a manual release of the Bowden control wire 39.

A non-conductive plug 83 (FIG. 3) is mounted on the actuating rod 74 for engagement with a pair of normally spaced electric leaf contacts 84 and 86. The contact 84 is connected to a lead 87 (FIGS. 1 and 2) to the wiper motor 26, and the leaf contact 86 is connected to a lead 88 connected in turn to the battery 27. It may readily be seen that upon movement of the actuating rod inwardly of the housing 41, the plug 83 will engage and move the leaf contact ends into a touching relation, thereby closing the circuit to the wiper motor 26.

Also mounted on the driven shaft 59 (FIG. 3), in addition to the cam wheel 61, is a cam 89 having a projection 91 spaced radially from the shaft 59. The projection 91, upon each revolution of the shaft 59, is adapted to engage one leg 92 of a bell crank 93 pivotally mounted on a shaft 94 which extends into the housing 45 (FIGS. 7 and 8). A second leg 95 (FIG. 6) of the bell crank 93 is secured to one end of a spring 96 which is connected to the housing 41, and a third leg 97 extends adjacent a resilient stop pad 100 mounted on the bottom 105 of the housing 41.

By this arrangement, the bell crank 93 is biased in a clockwise direction, as viewed in FIG. 6, and is limited to movement in that direction by engagement with the pad 100. Similarly to the initial or starting position of the cam wheel 61 as shown in FIG. 4, the cam 89 is illustrated in its initial starting position in FIG. 6. The bell crank 93 is rotated during the initial rotational stroke of the cam 89 by the sliding engagement therewith of the projection 91. After the projection 91 moves away from the leg 92, the bell crank returns to its non-actuated position while the cam 89 continues to rotate a complete revolution.

The washer pump, indicated generally at 98 in FIGS. 7 and 8, includes a pair of circular cavities 99 and 101 formed in the housing 45, and which are interconnected by a pair of passages 102 and 103. The passage 102 is provided with a fluid fitting 116 which is connected to the conduit 19 leading to the fluid reservoir 18, and the passage 103 is provided with a fluid fitting 114 which is connected to the conduit 22 leading to the nozzles 23. Passage 103 passes through the cavity 99 for communication at its inner end 105 with the cavity 101; and passage 102, in addition to being in communication with the cavity 101, has a port 104 in communication with the cavity 99.

A by-pass valve 106 is secured to the end of the shaft 94 within the pump housing 45. The by-pass valve 106 includes an irregular chamber 107 for communicating either both sides of the passage 103 with the cavity 99 (FIG. 7), or for communicating the passage side 105 with the port 104 (FIG. 8) while blocking the remainder of the passage 103.

Within the cavity 101, a circular disc 108 of a smaller diameter than the cavity 101 is eccentrically mounted. The disc 108 is secured to the inner end of the drive shaft 49, and includes a pair of diametrically opposed bores 109 formed therein. A vane 112 of a length not longer than that of a bore 109 is inserted into each bore 109. Upon rotation of the disc 108, in the direction of the arrow (FIGS. 7 and 8) the vanes 112 are forced outwardly of their bores 109 by centrifugal force and against the inner surface 113 of the cavity 101. This results in a withdrawal of fluid from the reservoir 18, through the conduit 19 and the passage 102, and into the cavity 101. The fluid is then forced through the passage side 105 and into the cavity 99. The position of the by-pass valve 106 therefore determines the remaining path of the fluid.

The position of the by-pass valve 106 as shown in FIG. 8 is the initial or starting position, and is comparable to the starting position of the bell crank 93 in FIG. 6. Upon pivoted movement of the bell crank 93 due to rotation of the cam 89, the by-pass valve 106 is simultaneously moved from its starting inoperative position of FIG. 8 to the operative position of FIG. 7. Thus, in the normal inoperative position of the bell crank 93, rotation of the disc 108 by the drive shaft 49 results in fluid being by-passed from the passage 102 through the irregular chamber 107 and back into the passage 102; no fluid being discharged through the outlet passage 103. However, upon movement of the bell crank 93 so as to rotate the by-pass valve 106 to the operative FIG. 7 position, by aligning the irregular chamber 107 with both sides of the passage 103, the fluid withdrawn from the passage 102 by the rotation of the disc 108 is directed through the irregular chamber 107 and the passage 103 to the conduit 22 for discharge through the nozzles 23.

In operation of clearing system, as mentioned hereinbefore, rotation of the knob 33 (FIG. 1) effects an energization of the wiper motor 26 independent of the washer unit 11. Operation of the wiper motor 26 results in rotation of the drive shaft 42; however, due to the position of the actuating rod 74 (FIG. 3) relative to the clutch 46, drive from the shaft 42 is not imparted to the gear 47.

The clutch 46 comprises a circular member 121 (FIG. 3) having a reduced shoulder portion 122 and secured to the drive shaft 42 by an Allen screw 123. Another circular member 124 having a shoulder portion 126 comparable in diameter to the portion 122, and integral with the gear 47, is rotatably mounted on the drive shaft 42, and held in close relationship to the member 121 by a pin 127. Inserted between the members 121 and 124 is a sleeve 128 having a projection 129 adapted to engage a lip 131 on the actuating rod 74. A coil spring 132 is wrapped about both shoulder portions 122 and 126, one end 133 of the spring 132 free and with the other end 134 attached to the sleeve 128.

With the projection 129 engaging the actuating rod lip 131, rotation of the drive shaft 42 in no way affects the clutch 46 other than rotating the member 121. However, upon removal of the lip 131 from the projection 129, rotation of the drive shaft 42 causes the coil spring 132 to tighten itself about both shoulder portions 122 and 126. Drive is thereby imparted from the drive shaft 42 through the clutch 46 to the gear 47.

When conjoint operation of the washer and wiper units 11 and 12 is desired, a knob 136 on the dashboard 17 is pushed, or pulled as the case may be, and the Bowden wire 39 is operated to move the actuating rod 74 inwardly of the washer kit housing 41. Upon being retained in that position by pivotal movement of the catch plate 71 relative to the lever end 68 and into the notch 82, the resulting contact of the leaf contacts 84 and 86 closes the circuit to the wiper motor 26 and rotates the drive shaft 42. As the lip 131 moves away from the projection 29, the clutch 46 locks the gear 47 to the shaft 42.

Due to the constant mesh of the gear train, rotation of the drive shaft 42 results in immediate rotation of the shaft 49 and thus the washer pump disc 108, and of the cam wheel 61 and the cam 89. With respect to the cam wheel 61 (FIG. 4), its rotation results initially in the lever end 65 dropping from the cam high side 80 onto the cam surface 62 thus pivoting the lever 63 counterclockwise as viewed in FIG. 4. As the catch plate 71 had moved off the stud 70 (FIGS. 3 and 4) upon movement into the actuating rod notch 82, the movement of the lever end 68 places it up against the catch plate lip 73.

Upon continued rotation of the cam wheel 61, the lever 63 remains stationary due to the radius of the cam surface 62 being constant until the beginning of the high side 80. Due to the progressive increased radius of the high side 80, as the one lever end 65 is depressed against the bias of the spring 66, the other lever end 68 is pivoted away from the actuating rod 74. By virtue of its engagement with the lip 73, the lever end 68 moves the catch plate 71 away from the actuating rod 74. As the catch plate 71 continues to move, a flared portion (not shown) thereof engages the stud 70 and moves the catch plate 71 from the lever end 68 so that the lip 73 is spaced outwardly of the lever end 68. By this arrangement the catch plate 71 is poised free and clear of the lever end 68 to enter the notch 82 when the actuating rod 74 is again pushed inwardly of the housing 41.

When the lever end 68 and catch plate 71 are completely clear of the notch 82, the actuating rod 74 is snapped back to its inoperative, outer position. The leaf contacts 84 and 86 separate immediately to their normally spaced relationship, thus breaking the wiper motor circuit and stopping the operation of the wiper motor 26. The actuating rod lip 131 (FIG. 3) is moved into transverse alignment with the clutch sleeve projections 129 so as to provide for a disengagement of the clutch 46 and the remainder of the washer kit gear train from the wiper motor 26.

Simultaneously with the initial rotative movement of the cam wheel 61 (FIG. 4), which begins a cycle of operation of the wiper-washer assembly 21 and which ends the cycle after one complete revolution of the cam wheel 61 as just described, the cam 89 (FIG. 6) begins its revolution. In so doing, it pivots the bell crank 93 to change the position of the by-pass valve 106 from the inoperative, fluid by-pass position of FIG. 8 to the operative, fluid discharge position of FIG. 7; and immediately upon rotation of the pin 91 past the bell crank leg 92, the by-pass valve 106 is returned to its inoperative, fluid by-pass position.

As the cam 89 continues to rotate the remainder of its cycle comprising one complete revolution, it may readily be appreciated that the wiper motor 26 continues to oscillate the wiper blades 24 across the windshield 13 subsequent to the cessation of fluid discharge, the latter occurring when the bell crank 93 snaps the by-pass valve 106 back to its inoperative, fluid by-pass position of FIG. 8. Thus, due to the relationship between the cam wheel 61, which determines a predetermined period of operation of the wiper motor 26, and the cam 89, which determines a shorter period of operation of the washer pump 98, a delay in time of wiper unit 12 de-actuation to washer unit 11 de-actuation is provided.

Although a preferred embodiment of this invention has been disclosed herein, it is not to be so limited as various modifications and alterations can be made thereto without departing from the scope of the invention as defined in the appended claims.

We claim:
1. A windshield cleaning system comprising a wiper unit including a wiper motor having a rotational output shaft, a washer unit including a washer pump operable for discharging fluid therefrom, hand operated means movable to one position for energizing said wiper motor and for detachably connecting said shaft to said washer pump whereby to discharge fluid therefrom, means set in motion by movement of said hand operated means to said one position for sequentially first rendering said washer pump inoperable to discharge fluid therefrom, and secondly moving said hand operated means to another position for de-energizing said wiper motor and for detaching said washer pump from said shaft.

2. A windshield cleaning system comprising a wiper unit including a wiper motor having a rotational output shaft, a washer unit including a washer pump operable to discharge fluid therefrom, clutch means releasably engageable with said shaft and operably connected to said washer pump, normally open switch means connected in circuit with said wiper motor and operable when closed to energize said wiper motor, hand operated means movable to one position to engage said clutch means with said shaft and to close said switch means, catch means movable in response to movement of said hand operated means to retain said hand operated means in said one position, and means set in motion by operation of said wiper motor to sequentially first render said washer pump inoperable to discharge fluid therefrom, and second to operate said catch means to release said hand operated means, whereby said clutch means is disengaged from said shaft and said switch means is opened.

3. A windshield cleaning system comprising a wiper unit including a wiper motor having a rotational output shaft, a washer unit including a discharge nozzle, a fluid reservoir, a washer pump operable to withdraw fluid from said reservoir, and operable further in a first position to discharge fluid through said discharge nozzle and in a second position to by-pass said fluid from said discharge nozzle, means providing for conjoint operation of said units including first means operable upon energization of said wiper motor to move said washer pump to said first position, and to releasably connect said output shaft to said washer pump, and second means operable to energize said wiper motor, and means providing for sequential de-actuation of said units including means set into operation by said first means for operating said second means to de-energize said wiper motor after operation of said first means to move said washer pump to said second position.

4. In a windshield cleaning system having a wiper unit including a wiper motor having a rotational output shaft, and a washer unit including a discharge nozzle and a fluid reservoir, an assembly for providing conjoint operation of the units comprising gear mechanism including a first shaft and a second shaft, normally disengaged clutch means connected to said gear mechanism and engageable with said output shaft, normally open switch means connected to said wiper motor for operation thereof upon closing, manually operated control means movable from a normal position to another position wherein said clutch means is engaged and said switch means is closed, a washer pump into which said first shaft extends, said washer pump operable upon rotation of said first shaft to withdraw fluid from said reservoir, means mounted on said second shaft including a valve mounted in said washer pump for directing said withdrawn fluid toward said nozzle during an initial portion only of one revolution of said second shaft, and other means mounted on said second shaft and engageable with said control means, said other means operable after one revolution of said second shaft to return said control means to said normal position where said clutch means is disengaged and said switch means is open.

5. A windshield cleaning system comprising a wiper unit including a wiper motor, a washer unit including a discharge nozzle, a fluid reservoir, a washer pump operable to withdraw fluid from said reservoir and discharge the fluid under pressure, and valve means receiving the fluid under pressure from said pump operable in a first position to direct the fluid to said discharge nozzle and in a second position to by-pass said fluid from said discharge nozzle, means providing for conjoint operation of said units including first means operable upon energization of said wiper motor to move said valve means to said first position, and to releasably connect said wiper motor to said washer pump, and second means operable to energize said wiper motor, and means providing for sequential de-actuation of said units including means set into operation by said first means for operating said second means to de-energize said wiper motor after operation of said first means to move said valve means to said second position.

6. A windshield cleaning system including, a wiper unit, a washer unit having a fluid discharge nozzle, a pump, and a valve means receiving fluid under pressure from said pump operable in a first position to direct fluid to said discharge nozzle and in a second position to by-pass said fluid from said nozzle, a single motor for effecting operation of both the wiper unit and the washer pump, means to effect wiper unit movement independent of actuation of the washer unit, means to effect conjoint operation of the washer unit and the wiper unit, means operable during said conjoint operation to hold said valve means in the first position for a first predetermined period of time and then automatically permit said valve means to move to the second position, and means to continue operation of the wiper unit for a second predetermined period of time after the valve means has moved to the second position.

7. A windshield cleaning system including a wiper unit, a washer unit having a fluid discharge nozzle, a pump and valve means receiving fluid under pressure from said pump operable in a first position to direct fluid to said discharge nozzle and in a second position to by-pass said fluid from said nozzle, control means for effecting conjoint operation of said wiper unit and washer unit, means operable during said conjoint operation to hold said valve means in the first position for a first predetermined period of time and then automatically permit said valve means to move to the second position, and means to continue operation of the wiper unit for a second predetermined period of time after the valve means has moved to the second position.

8. The windshield cleaning system defined in claim 7 including a single motor operatively connected to the wiper unit and to the washer pump, said operative connection including clutch means interconnecting the motor and washer pump, and control means movable to one position for energizing said motor and engaging said clutch means and movable to another position for de-energizing said motor and dis-engaging said clutch means.

9. A windshield cleaning system including a wiper unit, a washer unit having a fluid discharge nozzle, a pump and valve means operable in a first position to permit fluid to flow to said discharge nozzle and in a second position to prevent fluid flow to said nozzle, control means for effecting conjoint operation of said wiper unit and washer unit, and means operable during said conjoint operation to hold said valve means in the first position for a predetermined period of time and then automatically permit said valve means to move to the second position.

10. A windshield cleaning system including a wiper unit, a washer pump, a single motor operatively connected to the wiper unit and to the washer pump, clutch means to interrupt the operative connection between the motor and the washer pump, hand operated means movable to one position for energizing said motor and engaging said clutch means connecting the motor with the washer pump, and means operable during said conjoint operation for sequentially first rendering said washer pump inoperable to discharge fluid therefrom, and secondly moving said hand operated means to another position for de-energizing said motor and disengaging said clutch means.

References Cited in the file of this patent
UNITED STATES PATENTS
2,878,505  Ziegler _____ Mar. 29, 1959